No. 727,408. Patented May 5, 1903.

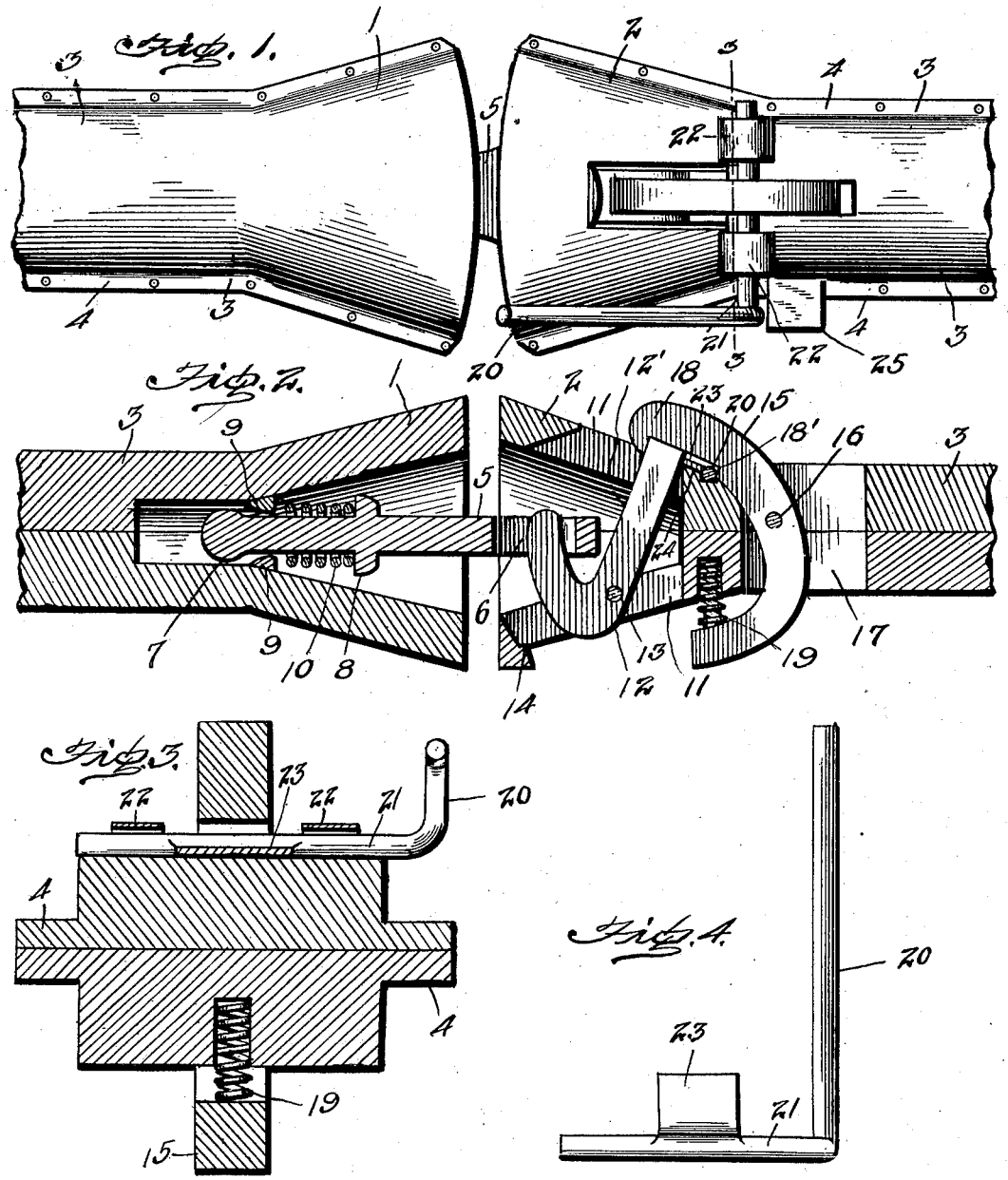

UNITED STATES PATENT OFFICE.

JOHN G. L. MYERS, OF OSCEOLA MILLS, PENNSYLVANIA.

CAR-COUPLING.

SPECIFICATION forming part of Letters Patent No. 727,408, dated May 5, 1903.

Application filed October 23, 1902. Serial No. 128,494. (No model.)

*To all whom it may concern:*

Be it known that I, JOHN G. L. MYERS, a citizen of the United States, residing at Osceola Mills, in the county of Clearfield and State of Pennsylvania, have invented certain new and useful Improvements in Car-Couplers; and I do declare the following to be a full, clear, and exact description of the invention, such as will enable others skilled in the art to which it appertains to make and use the same.

This invention relates to car-couplers.

The object of the invention is to provide a coupler which is simple, cheap, strong, and durable, which obviates the use of cushioned bumpers, which may be easily and conveniently coupled and uncoupled, and which is not liable to become casually disconnected in use.

With this object in view the invention consists in certain novel features of construction, combination, and arrangement of parts, which will be hereinafter more fully set forth, and particularly defined in the appended claim.

Figure 1 is a top plan view showing opposing parts of the coupler connected. Fig. 2 is a vertical longitudinal section of the same. Fig. 3 is a cross-section on line 3 3 of Fig. 1. Fig. 4 is a horizontal section through the coupling member carrying the draw-bar.

Referring now more particularly to the drawings, 1 and 2 represent opposing draw-heads, each of which is preferably of frusto-conical form and provided with an elongated shank 3, flanged, as shown at 4, for the passage of bolts to secure it to a car.

The draw-head 1 and its shank are chambered for the reception of a draw-bar 5, provided at its outer end with an eye 6, at its inner end with a head 7, and at a suitable point in advance of the latter with a collar or shoulder 8, said head and shoulder being adapted to abut against shoulders 9 on the shank to limit the inward and outward movements of said bar. A coiled spring 10 surrounds the bar between the collar 8 and shoulders 9 and cushions the bar on its inward movement, as well as projects the same when pressure is relieved therefrom, thereby limiting the jolting between the coupling members and obviating the use of cushioned bumpers when the coupling is employed for comparatively light draft-work, such as on mine-cars.

The draw-head 2 is formed with slots 11 at top and bottom to accommodate the swing of a coupling-hook 12, which is adapted to engage the eye 6 on the draw-bar 5. This hook is intermediately pivoted upon a transverse pin or bolt 13 and tilts upwardly thereon in coupling and downwardly in uncoupling and is limited on its upward movement by the rear wall of the draw-head and in its downward movement by a shoulder 14, engaging the bottom of said wall. In coupling the outer end of the draw-bar 5 enters the draw-head 1 and abuts against the upper portion or shank 12' of the hook, thereby swinging said shank rearwardly and the hook 12 upwardly, whereby the latter is caused to project through the eye 6. In uncoupling the outward movement of the draw-bar swings the hook forwardly and downwardly, in which position it is retained by gravity until the entering draw-bar again contacts with the shank 12'.

A segmental latch 15 is pivoted to swing upon a transverse bolt 16 in a slot 17, formed in the shank 3 of the draw-head 2, and is provided at its upper end with a hook 18 to engage the shank 12' of the hook 12 and lock said hook in coupling position. The lower end of the latch is acted upon by a coiled spring 19, which normally throws the hooked end of the latch forward and downward or in position to engage said shank.

A hand-lever 20 has an angularly-bent portion 21, extending transversely across the top of the rear portion of the draw-head 2 and journaled in suitable bearings 22 to rock or oscillate, and this portion 21 carries a lateral flange or lug 23, which is adapted when the lever 20 is swung back to engage and lift the hooked end 18 of the latch 15 out of engagement with the shank 12' of the coupling-hook 12. A forward movement of the lever, on the contrary, moves the lug 23 out of engagement with the latch and allows the said hooked end 18 thereof to engage the shank 12' of the coupling-hook 12, thereby holding the latter in coupling position. The draw-head 2 is formed with an inclined shoulder 24 to receive the lug and support the lever when the latter is swung forward, while the latch has a shoulder 18' and the shank of the draw-head a shoulder 25, against which the lug and lever bear when the latter is swung back to extract the latch, and whereby the lever is held from casual forward movement in an obvious manner.

From the foregoing description, taken in connection with the accompanying drawings, the construction, mode of operation, and advantages of my invention will be readily apparent, it is thought, without requiring a more extended explanation.

Various changes in the form, proportion, and minor details of construction may be resorted to without departing from the principle or sacrificing any of the advantages of this invention.

Having thus fully described my invention, what I claim, and desire to secure by Letters Patent, is—

In a car-coupling, the combination with a draw-head carrying a spring-projected coupling-bar, of a companion draw-head formed with openings in its top and bottom and provided with a vertical slot in its shank, a coupling member pivoted to the latter-named draw-head and provided with a hook moving in said bottom slot and a shank moving in said top slot, a segmental latch pivoted intermediately of its ends within said vertical slot in the shank and having its upper end formed into a catch to engage the shank of the coupling member, a spring seated in the base of the draw-head and acting on the lower end of the latch to force the same rearward and the catch forward, and a lever having a lug to engage and force the catch end of the latch out of engagement with the shank against the tension of said spring, substantially as described.

In testimony whereof I have hereunto set my hand in presence of two subscribing witnesses.

JOHN G. L. MYERS.

Witnesses:
DOMER MYERS,
A. R. TINGLE.